3,031,476
6-METHYL-11,17α-DIOXYGENATED-4,6-PREGNA-DIENES (AND 1,4,6-PREGNATRIENES)
John A. Hogg and Alan H. Nathan, Kalamazoo Township, Kalamazoo County, Mich., assignors to The Upjohn Company, Kalamazoo, Mich., a corporation of Delaware
No Drawing. Filed Mar. 25, 1959, Ser. No. 801,702
21 Claims. (Cl. 260—397.45)

This invention relates to novel steroids and is more particularly concerned with 6-dehydro-6-methylcortisone, 6-dehydro - 6 - methylhydrocortisone, 1,6 - bisdehydro-6-methylcortisone, 1,6-bisdehydro-6-methylhydrocortisone, their 21-acylates and a process for the production thereof. It further relates to derivatives of these compounds, such as, 6-dehydro-6-methyl-21-desoxycortisone, 6-dehydro-6-methyl - 21 - desoxyhydrocortisone; 6 - dehydro-6-methyl-9α-fluorocortisone, 6-dehydro-6-methyl-9α-fluorohydrocortisone and the 21-acylates thereof; 6-dehydro-6-methyl-9α-fluoro-21-desoxycortisone, 6-dehydro-6-methyl-9α-fluoro-21-desoxyhydrocortisone, 6-dehydro-6-methyl-9α,21 - difluoro-21-desoxycortisone, 6-dehydro-6-methyl-9α,21-difluoro-21-desoxyhydrocortisone, as well as the corresponding 1,6-bisdehydro compounds and to processes for their production. These derivatives have corticoid activity.

The 21-acylates of the novel 6-dehydro-6-methylcortisone, 6-dehydro-6-methylhydrocortisone, 1,6-bisdehydro-6-methylcortisone, 1,6-bisdehydro-6-methylhydrocortisone and the corresponding free 21-alcohols possess a high order of glucocorticoid and anti-inflammatory activity. They are useful in the treatment of various arthritic conditions and in the control of inflammatory conditions due to bacterial infections or allergic reactions of skin or mucous membranes. The compounds cause a loss of salt and water which makes them especially valuable in the management of chronic congestive heart failure and in the treatment of cirrhosis of the liver, the nephrotic syndrome and the treatment of eclampsia and pre-eclampsia. For example, 6-dehydro-6-methylcortisone 21-acetate has glucocorticoid activity of about three times that of Kendall's Compound F and anti-inflammatory activity of about six times that of Kendall's Compound F. 6-dehydro-6-methylhydrocortisone 21-acetate exhibits glucocorticoid activity of about three times that of Kendall's Compound F and anti-inflammatory activity of more than eight times that of Kendall's Compound F.

The process of this invention comprises: dehydrogenating a 6α-methylhydrocortisone 21-acylate or the free alcohol, (I) below, with chloranil to obtain the corresponding 6-methyl-11β,17α,21-trihydroxy-4,6-pregnadiene-3,20-dione 21-acylate or the free alcohol (II). Chromic acid oxidation of 6-methyl-11β,17α,21-trihydroxy-4,6-pregnadiene-3,20-dione 21-acylate yields the corresponding 6-methyl - 17α,21-dihydroxy-4,6-pregnadiene-3,11,20-trione 21-acylate (III). Dehydrating a 6-dehydro-6-methylhydrocortisone 21-ester or the free alcohol (II) illustratively with sulfuric acid or preferably with a hypohalous acid and then with anhydrous sulfur dioxide is productive of the corresponding 6-methyl-17α,21-dihydroxy-4,6,9(11)-pregnatriene-3,20-dione 21-ester or the free alcohol (IV). Addition of a hypohalous acid, such as, hypochlorous or hypobromous acid results in 6-methyl-9α-halo-11β,17α,21-trihydroxy-4,6-pregnadiene-3,20-dione acylate or the free alcohol (V), which by treatment with a base such as anhydrous potassium acetate yields the epoxy compound 6 - methyl - 9β,11β - oxido-17α,21-dihydroxy-4,6-pregnadiene-3,20-dione 21-acylate or the unesterified product, both represented by Formula VI. Treatment of the epoxy compound (VI) with hydrogen fluoride or other hydrogen fluoride releasing agents provides the physiologically-active fluoro derivative, 6-methyl - 9α - fluoro-11β,17α,21-trihydroxy-4,6-pregnadiene-3,20-dione 21-acylate or the free triol 6-dehydro-6-methyl-9α-fluorohydrocortisone, represented by Formula VII. Oxidation of the esterified compound (VII) with chromic acid in acetic acid provides the 6 - methyl - 9α - fluoro-17α,21-dihydroxy-4,6-pregnadiene-3,11,20-trione 21-acylate (VIII). Hydrolysis of the ester VIII with a base provides the free alcohol 6-methyl-9α-fluoro - 17α,21 - dihydroxy - 4,6 - pregnadiene-3,11,20-trione (6 - dehydro-6-methyl-9α-fluorocortisone). Treating 6-methyl-9α-halo - 11β,17α,21 - trihydroxy-4,6-pregnadiene-3,20-dione (6-dehydro-6-methyl - 9α - halohydrocortisone) (VII) with an organic sulfonyl halide is productive of the corresponding 21-ester (IX), a 21-alkyl or aryl sulfonate of 6-methyl-9α-halo-11β,17α,21-trihydroxy-4,6-pregnadiene-3,20-dione, and thereafter treating the thus produced 21-alkyl or aryl sulfonate with a fluorinating agent produces the corresponding 6-methyl-21-fluoro-9α-halo - 11β,17α - dihydroxy-4,6-pregnadiene-3,20-dione (XI). The 6-methyl-21-fluoro product (XI) above can be oxidized with chromic acid to give the corresponding 6 - methyl-21-fluoro-9α-halo-17α-hydroxy-4,6-pregnadiene-3,11,20-trione (XII). Alternatively, the 6-methyl-9α - halo-11β,17α,21-trihydroxy - 4,6 - pregnadiene-3,20-dione 21-alkyl or aryl sulfonate (IX) can be reacted with an iodinating agent such as sodium iodide in an oxygenated hydrocarbon solvent such as acetone to produce the corresponding 21-iodo steroid (X), which can be fluorinated to yield the 21-fluoro steroid (XI). Similarly, when the 11-keto analogue (6-dehydro-6-methyl-9α-halocortisone) is utilized in place of VII as the starting material in the above series of reactions, 6-methyl-21-fluoro-9α-halo-17α-hydroxy - 4,6 - pregnadiene - 3,11,20 - trione (XII) is produced directly without the step of chromic acid oxidation.

The starting steroids of this invention are 6α-methylhydrocortisone 21-acylates, the corresponding 6β-epimers, or 6α-methylhydrocortisone and the corresponding 6β-epimer, obtained as described in Preparations 1 through 7.

The compounds of this invention are useful in starting materials for the production of other physiologically important compounds. For example, 6-methyl-11β,17α,21-trihydroxy-4,6-pregnadiene-3,20-dione or the 21-acylates thereof can be converted by fermentative dehydrogenation in the 1-position by microorganisms to the corresponding 1,4,6-pregnatriene compounds, i.e., 1,6-bisdehydro-6-methylhydrocortisone, or the 21-acylates thereof. Microorganisms selected from the genera consisting of Calonectria, Alternaria, Collectotrichum, Cylindrocarpon, Ophiobolus, Septomyxa, Didymella, Corynebacterium, Fusarium, Listeria and Erysipelothrix are useful for the dehydrogenation in the 1-position of the compounds of this invention. Septomyxa, especially the species *Septomyxa affinis* A.T.C.C. 6737 and Corynebacterium, especially *Corynebacterium simplex* are preferred for production of 6-methyl-11β,17α,21-trihydroxy-1,4,6-pregnatriene-3,20-dione or the 21-acylates thereof from the corresponding 4,6-pregnadiene compounds. The compounds and processes of this invention are illustratively represented by the following sequence of formulae:

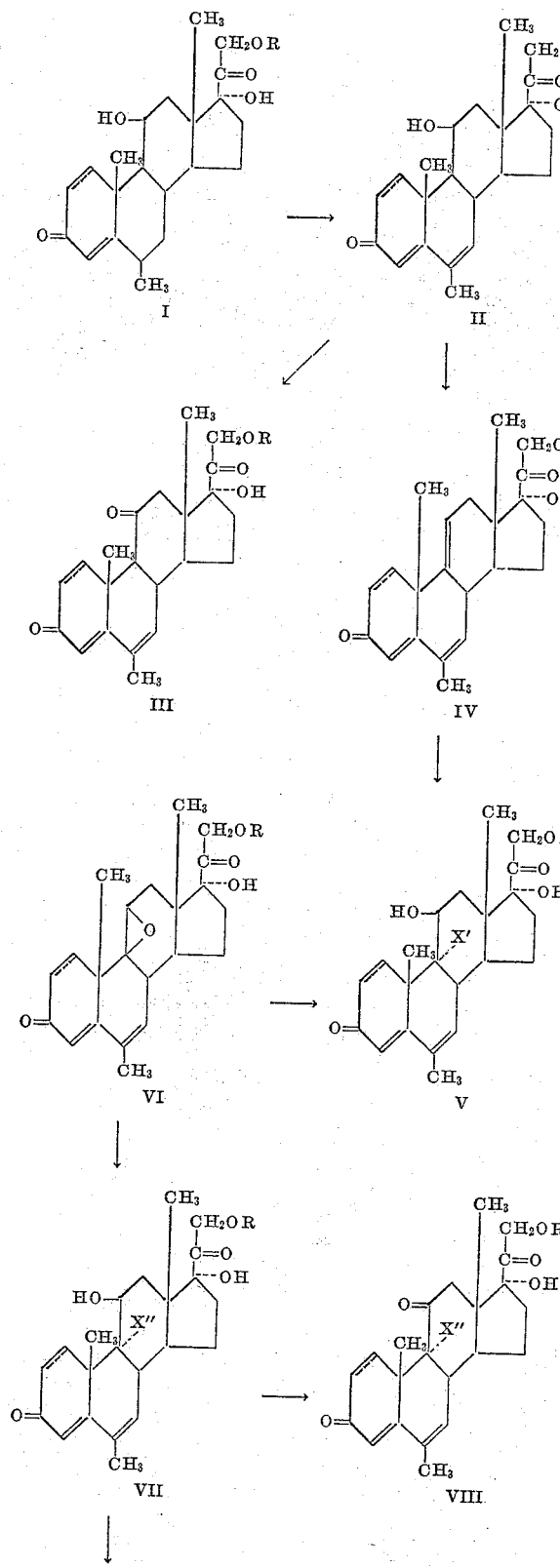

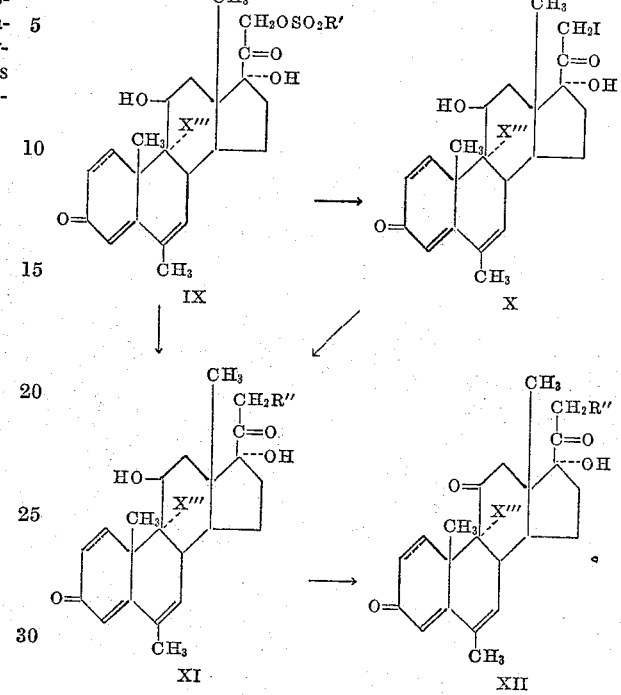

wherein R is selected from the group consisting of hydrogen and acyl, the acyl radical is of an organic carboxylic acid, preferably a hydrocarbon carboxylic acid containing from one to twelve carbon atoms, inclusive, R' is lower alkyl or aryl, containing from one to eight carbon atoms, inclusive, R'' is hydrogen or fluorine, X' is a halogen having an atomic weight from 35 to 80, inclusive, i.e., chlorine or bromine, X'' is a halogen having an atomic weight from nineteen to 36, inclusive, i.e., fluorine or chlorine, and X''' is a halogen of atomic weight between nineteen and eighty, inclusive, i.e., fluorine, chlorine, or bromine. The broken line appearing in each of the formulae indicates a $\Delta^1$-double bond which may or may not be present in each of the formulae and represents $\Delta^4$, $\Delta^{1,4}$, $\Delta^{4,6}$, and $\Delta^{1,4,6}$-compounds.

The following preparations and examples are illustrative of the process and products of the present invention, but are not to be construed as limiting.

PREPARATION 1

*5α,6α-Oxido-11β,17α,21-Trihydroxyallopregnane-3,20-Dione 3,20-Bis-(Ethylene Ketal)*

To a solution of 0.901 g. of 11β,17α,21-trihydroxy-5-pregnene-3,20-dione 3,20-bis-(ethylene ketal) in 18 ml. of chloroform was added a solution of 331 ml. of perbenzoic acid in 5.19 ml. of chloroform. The resulting solution was allowed to stand in the refrigerator (ca. 4° C.) for a period of 24 hours and thereupon at room temperature for an additional period of 72 hours. The reaction solution was then washed with 5% sodium bicarbonate solution and water, dried over anhydrous sodium sulfate, and evaporated to dryness to give 1.031 g. of crude solid. Recrystallization from acetone gave 431 mg. of material of melting point 230 to 247° C. The mother liquor, after evaporation to dryness, was dissolved in methylene chloride and chromatographed over 25 g. of acid washed alumina. The column was developed with three fractions each of methylene chloride plus 5, 10, 15, 20, 25 and 50% acetone, acetone, and acetone plus 5% methanol. The acetone plus 5% methanol eluate gave an additional 279 mg. of the high melting product. The high melting material, 5α,6α-oxido-11β,17α,21-trihydroxyallopregnane-3,20-dione 3,20-bis-(ethylene ketal) was three times recrystallized from acetone and methanol to give a pure product of melting point 263 to 268° C. Other eluate fractions of lower melting point contained the 5β,6β-isomer thereof.

In the same manner as shown in Preparation 1, other 5α,6α - oxido - 11β,17α,21 - trihydroxyallopregnane-3,20-dione 3,20-bis-(alkylene ketals) can be prepared by reacting hydrocortisone diketals, wherein the ketal group has been formed by reacting the steroid 3,20-dione with ethylene, propylene, 1,2-, 1,3-, or 2,3-butylene glycol or pentane, hexane, heptane, or octane-diols wherein the alcohol groups are in vicinal positions such as 1,2, 2,3, 3,4, or the like, or separated by one carbon atom such as 1,3, 2,4, 3,5, and the like, with an organic peracid such as performic, peracetic, perbenzoic, monoperphthalic acid, or the like. For the purpose of this invention, starting compounds having the ethylene ketal groups are preferred, since these ketals are generally more easily prepared in high yield than ketals produced by the reaction of the 3,20-diketo compounds with higher alkanediols.

PREPARATION 2

5α,11β,17α,21-Tetrahydroxy-6β-Methylallopregnane-3,20-Dione 3,20-Bis-(Ethylene Ketal)

A solution of 1.115 g. of 5α,6α-oxido-11β,17α,21-trihydroxyallopregnane-3,20-dione 3,20-bis-(ethylene ketal) in 165 ml. of tetrahydrofuran (the tetrahydrofuran being dried through distillation over lithium aluminum hydride) was added dropwise to a solution of 95 ml. of methyl magnesium bromide in ether (the magnesium bromide having a 4 M. concentration). To this mixture was added 575 ml. of benzene and the reaction mixture was thereupon allowed to stir and reflux for 26 hours. After cooling, the reaction mixture was poured into 700 ml. of iced, saturated ammonium chloride solution, stirred for a period of thirty minutes, and the benzene layer separated from the aqueous layer. The aqueous phase was extracted with three 200-ml. portions of ethyl acetate and the extracts added to the benzene layer. The combined benzene-ethyl acetate solution was thereupon washed with water, dried over anhydrous sodium sulfate and evaporated to dryness to give 1.314 g. of crude solid. Trituration of this material with ether left 1.064 g. of crystalline product of melting point 221 to 230°. Recrystallization of this material gave 5α,11β,17α,21-tetrahydroxy-6β-methylallopregnane-3,20-dione 3,20-bis-(ethylene ketal) of melting point 228 to 233° and rotation [α]$_D$ minus eleven degrees in chloroform.

*Analysis.*—Calcd. for $C_{26}H_{42}O_8$: C, 64.70; H, 8.77. Found: C, 64.29; H, 8.69.

PREPARATION 3

5α,11β,17α,21-Tetrahydroxy-6β-Ethylallopregnane-3,20-Dione 3,20-Bis-(Ethylene Ketal)

In the same manner as shown in Preparation 2, 5α,6α-oxido-11β,17α,21-trihydroxyallopregnane-3,20-dione 3,20-bis-(ethylene ketal), was reacted with ethyl magnesium bromide in ether solution to give the corresponding 5α,11β,17α,21 - tetrahydroxy - 6β-ethylallopregnane-3,20-dione 3,20-bis-(ethylene ketal).

In the same manner as shown in Preparations 2 and 3, other 5α,11β,17α,21 - tetrahydroxy - 6β-alkylallopregnane-3,20-dione 3,20-bis-(ethylene ketals) are prepared by reacting the corresponding 5α,6α-oxido-11β,17α,21-trihydroxyallopregnane-3,20-dione 3,20-bis-(ethylene ketal) with a metal alkyl or metal aryl more specifically an alkyl or aryl metal halide such as a Grignard reagent, for example, methyl, ethyl, propyl, isopropyl, butyl, isobutyl, pentyl, hexyl, and phenyl magnesium bromides and iodides or cadmium alkyl and calcium alkyl and phenyl bromides or iodides. Representative 6β-alkylated or 6β-arylated allopregnanes thus prepared include: 5α,11β,17α,21-tetrahydroxy-6β-propylallopregnane-3,20-dione 3,20-bis-(ethylene ketal), 5α,11β,17α,21 - tetrahydroxy - 6β-butylallopregnane-3,20-dione 3,20-bis-(ethylene ketal), 5α,11β, 17α,21 - tetrahydroxy - 6β-isobutylallopregnane-3,20-dione 3,20-bis-(ethylene ketal), 5α,11β,17α,21-tetrahydroxy-6β-pentylallopregnane-3,20-dione 3,20-bis-(ethylene ketal), 5α,11β,17α,21 - tetrahydroxy - 6β-hexylallopregnane-3,20-dione 3,20-bis-(ethylene ketal), 5α,11β,17α,21-tetrahydroxy - 6β-phenylallopregnane-3,20-dione 3,20-bis-(ethylene ketal), and the like.

PREPARATION 4

5α,11β,17α,21-Tetrahydroxy-6β-Methylallopregnane-3,20-Dione

A solution was prepared containing 468 mg. of 5α,11β,17α,21 - tetrahydroxy - 6β-methylallopregnane-3,20-dione 3,20-bis-(ethylene ketal), 38 ml. of methanol and 7.7 ml. of 2 N sulfuric acid. This solution was refluxed for a period of thirty minutes, then neutralized with five percent dilute sodium bicarbonate solution (about 100 ml.) and concentrated under reduced pressure at 55° C. to about 35 ml. of volume. A product crystallized upon cooling and was recovered by filtration. This product was recrystallized from acetone-Skellysolve B hexanes to give an analytically pure sample of 5α,11β,17α,21-tetrahydroxy - 6β-methylallopregnane-3,20-dione of melting point 240 to 244° C. (decomposition) and rotation [α]$_D$ plus forty degrees in dioxane.

*Analysis.*—Calcd. for $C_{22}H_{34}O_6$: C, 66.98; H, 8.69. Found: C, 66.84; H, 8.86.

PREPARATION 5

5α,11β,17α,21-Tetrahydroxy-6β-Ethylallopregnane-3,20-Dione

In the same manner as shown in Preparation 4, 5α,11β,17α,21 - tetrahydroxy - 6β - ethylallopregnane - 3,20-dione 3,20-bis-(ethylene ketal) was hydrolyzed with dilute sulfuric acid in ethanol solution to give 5α,11β,17α,21-tetrahydroxy-6β-ethylallopregnane-3,20-dione.

In the same manner as shown in Preparations 4 and 5, hydrolysis of other 5α,11β,17β,21-tetrahydroxy-6β-alkylallopregnane-3,20-dione 3,20-bis-(ethylene ketals), as well as those 6β-alkylallopregnane-3,20-dione 3,20-bis-(ketals) wherein the ketal group is other than ethylene, gives the corresponding 5α,11β,17α,21-tetrahydroxy-6β-aryl or alkylallopregnane-3,20-diones such as, for example, 5α,11β,17α,21 - tetrahydroxy-6β-propylallopregnane-3,20 - dione 5α,11β,17α,21-tetrahydroxy-6β-butylallopregnane-3,20-dione, 5α,11β,17α,21-tetrahydroxy-6β-isobutylallopregnane - 3,20-dione, 5α,11β,17α,21-tetrahydroxy-6β-pentylallopregnane - 3,20 - dione, 5α,11β,17α,21 - tetrahydroxy - 6β - hexylallopregnane-3,20-dione, 5α,11β,17α,21-tetrahydroxy-6β-phenylallopregnane-3,20-dione, and the like.

PREPARATION 6

6α-Methylhydrocortisone

A stream of nitrogen was bubbled through a solution of 429 mg. of 5α,11β,17α,21-tetrahydroxy-6β-methylallopregnane-3,20-dione contained in 100 ml. of denatured absolute alcohol for a period of ten minutes. To this solution was added 4.3 ml. of 0.1 normal sodium hydroxide solution which had likewise been treated with nitrogen. The mixture was allowed to stand in a nitrogen atmosphere for a period of eighteen hours and thereupon was acidified with acetic acid, and concentrated under reduced pressure at 55° C. to dryness. The residue weighing 417 mg. was recrystallized from acetone-Skellysolve B hexanes to give in two crops 249 mg. of 6α-methylhydrocortisone melting between 184 and 194° C. An analytical sample was prepared melting at 203 to 208° C. and consisting of 6α-methylhydrocortisone.

*Analysis.*—Calcd. for $C_{22}H_{32}O_5$: C, 70.18; H, 8.57. Found: C, 70.32; H, 8.50.

The mother liquors contained besides 6α-methylhydrocortisone, substantial amounts of 6β-methylhydrocortisone which can be isolated by recrystallization, papergram, countercurrent procedures and other means known in the art.

Esterification of 6α-methylhydrocortisone with acetic anhydride in pyridine at room temperature yielded 6α-methylhydrocortisone 21-acetate of melting point 213 to 214° C.

*Analysis.*—Calcd. for $C_{24}H_{34}O_6$: C, 68.87; H, 8.19. Found: C, 68.60; H, 8.41.

Esterification of 6α-methylhydrocortisone with other carboxylic acid anhydrides is productive of the corresponding 6α-methylhydrocortisone 21-acylates.

PREPARATION 7

6β-Methylhydrocortisone

A solution was prepared containing 27.5 g. of 5α,11β,17α,21-tetrahydroxy-6β-methylallopregnane-3,20-dione in 6500 ml. of ethanol denatured with methanol. The solution was freed of air oxygen by bubbling oxygen-free nitrogen through it for a period of fifteen minutes. To this solution was added a similarly air oxygen-free prepared solution of one-tenth normal sodium hydroxide (235 ml.). The solution was allowed to stand at room temperature (about 22 to 24° C.) in an inert nitrogen atmosphere for a period of twenty hours and was then acidified with 14 ml. of acetic acid. The thus obtained acid solution was evaporated at about 50 to 60° C. in vacuo, the thus produced residue dissolved in 200 ml. of ethyl acetate and 200 ml. of water, the water layer separated from the organic layer and discarded, the organic layer washed with 350 ml. of 5% aqueous sodium bicarbonate solution, then three times with water and thereupon dried over anhydrous sodium sulfate and concentrated to a volume of 180 ml. After cooling the 180 ml. of solution in a refrigerator (about 5° C), the solution was filtered giving 11.9 g. of material. This material was redissolved in 500 ml. of ethyl acetate, the ethyl acetate solution was concentrated to 150 ml., refrigerated as before to give 6.15 g. of crude 6β-methylhydrocortisone of melting point 220 to 223° C.

Recrystallization of the crude 6β-methylhydrocortisone three more times from ethyl acetate gave an analytical sample of 6β-methylhydrocortisone with melting point 223 to 227° C., rotation $[\alpha]_D$ plus 105 degrees in acetone; ultraviolet absorption $$\lambda_{max.}^{95\%} \text{ ethanol } 243 \text{ m}\mu;\ a_M = 14,500$$

*Analysis.*—Calcd. for $C_{22}H_{32}O_5$: C, 70.17; H, 8.57. Found: C, 70.54; H, 8.91.

Esterification of 6β-methylhydrocortisone with acetic anhydride in pyridine yielded 6β-methylhydrocortisone 21-acetate. Esterification with other carboxylic acid anhydrides is productive of the corresponding 6β-methylhydrocortisone 21-acylates.

In the same manner as in Preparations 1 through 7, substituting the corresponding 1- dehydro compound as the starting steroid yields the corresponding 1-dehydro product.

PREPARATION 8

6α-Ethylhydrocortisone

In the same manner as shown in Preparation 6, 5α,11β,17α,21-tetrahydroxy-6α-ethylallopregnane-3,20-dione was treated with a solution of potassium hydroxide in methanol to give at room temperature 6α-ethylhydrocortisone of melting point 223 to 226° C. and $$\lambda_{max.}^{EtOH} 243;\ \epsilon\ 14,525$$

In the same manner dehydrating with an alkali metal hydroxide in alcoholic solution other 5α,11β,17α,21-tetrahydroxy-6β-aryl or alkylallopregnane-3,20-diones produced the corresponding 6α-alkyl-11β,17α-21-trihydroxy-6-alkyl-4-pregnene-3,20-diones such as 6α-propylhydrocortisone, 6α-butylhydrocortisone, 6α-isobutylhydrocortisone, 6α-pentylhydrocortisone, 6α-hexylhydrocortisone, 6α-phenylhydrocortisone and the like.

PREPARATION 9

1-Dehydro-6α-Methylhydrocortisone (6α-Methyl-11β,17α,21-Trihydroxy-1,4-Pregnadiene-3,20-Dione)

Six 100-ml. portions of a medium in 250-ml. Erlenmeyer flasks containing 1% glucose, 2% corn steep liquor (60% solids) and tap water was adjusted to a pH of 4.9. This medium was sterilized for 45 minutes at fifteen pounds per square inch pressure and inoculated with a one to two day growth of *Septomyxa Affinis* A.T.C.C. 6737. The Erlenmeyer flasks were shaken at room temperature at about 24° C. for a period of three days. At the end of this period, this 600-ml. volume was used as an inoculum for 10 l. of the same glucose-cornsteep liquor medium which in addition contained 10 ml. of an antifoam (a mixture of lard oil and octadecanol). The fermentor was placed into the water bath, adjusted to 28° C., and the contents stirred (300 r.p.m.) and aerated (0.5 l. air per minute/10 l. beer). After seventeen hours of incubation, when a good growth developed and the acidity rose to pH 6.7, 2 g. of 6α-methylhydrocortisone plus 1 g. of 3-ketobisnor-4-cholen-22-al, dissolved in 115 ml. of dimethylformamide, was added and the incubation (conversion) carried out at the same temperature and aeration for 24 hours (final pH 7.9). The mycelium (56 g. dry weight) was filtered off and the steroidal material was extracted with methylene chloride, the methylene extracts evaporated to dryness, and the resulting residue chromatographed over a Florisil synthetic magnesium silicate column. The column was packed with 200 g. of Forisil and was developed with five 400-ml. fractions each of methylene chloride, Skellysolve B-acetone mixtures of 9:1, 8:2, 7:3, 1:1, and methanol. The fraction eluted with Skellysolve B-acetone (7:3) weighed 1.545 g. and on recrystallization from acetone gave, in three crops, 928 mg. of product of melting point 210 to 235° C. The sample prepared for analysis melted at 245 to 247° C. Rotation $[\alpha]_D$ was plus 83 degrees in dioxane.

*Analysis.*—Calcd. for $C_{22}H_{30}O_5$: C, 70.56; H, 8.08. Found: C, 70.53; H, 7.94.

$$\lambda_{max.}^{EtOH} 243,\ \epsilon = 14,875$$

Infrared absorption in Nujol mineral oil suspension:

| | Cm.$^{-1}$ |
|---|---|
| OH | 3430, 3330, 3180 |
| 20-keto | 1706 |
| Conjugated 3-keto | 1645 |
| $\Delta^{1,4}$-double bond | 1592 |

Instead of by fermentative dehydrogenation, 1-dehydro-6α-methylhydrocortisone or an ester thereof can be obtained by dehydrogenation of 6α-methylhydrocortisone or an ester thereof with selenium dioxide as illustrated in Preparation 10.

PREPARATION 10

1-Dehydro-6α-Methylhydrocortisone Acetate

A mixture of 70 mg. of 6α-methylhydrocortisone acetate in 4.5 ml. of tertiary butyl alcohol and 0.45 ml. of acetic acid and 24 mg. of selenium dioxide was heated to 75° C. and stirred for 24 hours. Thereafter another 24 mg. portion of selenium dioxide was added and heating at 75° C. and stirring continued for an additional 24 hours. Thereafter the mixture was cooled, filtered to remove the selenium dioxide and evaporated. Paper chromatography showed the residue to contain about 50 to 55% of 1-dehydro-6α-methylhydrocortisone acetate which can be recovered from the residue by recrystallization and chromatography.

Infrared absorption in Nujol mineral oil suspension:

| | Cm.$^{-1}$ |
|---|---|
| OH | 3400, 3280 |
| 11- and 20-keto | 1722, 1700 |
| Conjugated 3-keto | 1655 |
| $\Delta^{1,4}$-double bond | 1611, 1597 |

PREPARATION 11

1-Dehydro-6β-Methylhydrocortisone

In the same manner given in Preparation 9 fermenting with Septomyxa affinis in a nuitrient medium with crude 11β,21-dihydroxy-4,17(20)-pregnadien-3-one as promoter 6β-methylhydrocortisone yielded 1-dehydro-6β-methylhydrocortisone.

PREPARATION 12

In the manner shown in Preparation 11, by fermentation with microorganisms of the genera Corynebacterium, Didymella Calonectria, Alternaria, Colletotrichum, Cylindrocarpon, Ophiobolus, Septomyxa, Fusarium, Listeria or Erysipelothrix:

(a) 6-ethylhydrocortisone (6α- or 6β-epimer) yielded the corresponding 1-dehydro-6-ethylhydrocortisone.

(b) 6-propylhydrocortisone yielded 1-dehydro-6-propylhydrocortisone.

(c) 6-butylhydrocortisone yielded 1-dehydro-6-butylhydrocortisone.

(d) 6-hexylhydrocortisone yielded 1-dehydro-6-hexylhydrocortisone.

(e) 6-phenylhydrocortisone yielded 1-dehydro-6-phenylhydrocortisone.

In the same manner as shown in Preparations 9 and 11, other 1-dehydro-6-alkyl- and 1-dehydro-6-arylhydrocortisones are produced by subjecting the corresponding 6-alkylated or 6-arylated hydrocortisone or the esters thereof to fermentation especially by Corynebacterium simplex or Septomyxa affinis in the absence or presence of steroidal promoters, such as, 3-ketobisnor-4-cholen-22-al, crude 11β,21-dihydroxy-1,4,17(20)-pregnatrien-3-one, 3-ketobisnor-4-cholenic acid and progresterone. Representative 1-dehydro-6α-alkyl- and 1-dehydro-6α-arylhydrocortisones thus produced include: 1-dehydro-6α-pentylhydrocortisone, 1-dehydro-6α-hexylhydrocortisone, 1-dehydro-6α-isobutylhydrocortisone, 1-dehydro-6α-isopropylhydrocortisone, 1-dehydro-6α-phenylhydrocortisone, and the like.

PREPARATION 13

1-Dehydro-6α-Methylhydrocortisone Acetate

A mixture was prepared containing 500 mg. of 1-dehydro-6α-methylhydrocortisone in 5 ml. of pyridine and 5 ml. of acetic anhydride. The mixture was maintained at room temperature (22 to 24° C.) for a period of six hours, thereupon poured into 100 ml. of ice water and the resulting aqueous mixture extracted with three 25-ml. portions of methylene chloride. The combined methylene chloride solutions were washed, dried over sodium sulfate and evaporated and the thus obtained residue recrystallized three times from acetone-Skellysolve B hexanes to give pure 1-dehydro-6α-methylhydrocortisone 21-acetate (6 - methyl - 11β,17α - dihydroxy-21-acetoxy-1,4-pregnadiene-3, 20-dione).

PREPARATION 14

In the same manner as given in Example 13, treating in pyridine solution:

(a) 1-dehydro-6α-methylhydrocortisone with propionic anhydride yielded 1-dehydro-6α-methylhydrocortisone 21-propionate.

(b) 1-dehydro-6α-methylhydrocortisone with butyric anhydride yielded 1-dehydro-6α-methylhydrocortisone 21-butyrate.

(c) 1-dehydro-6α-methylhydrocortisone with valeric anhydride yielded 1-dehydro-6α-methylhydrocortisone 21-valerate.

(d) 1-dehydro-6α-methylhydrocortisone with hexanoyl bromide yielded 1-dehydro-6α-methylhydrocortisone 21-hexanoate.

(e) 1-dehydro-6α-methylhydrocortisone with octanoyl chloride yielded 1-dehydro-6α-methylhydrocortisone 21-octanoate.

(f) 1-dehydro-6α-methylhydrocortisone with benzoyl chloride yielded 1-dehydro-6α-methylhydrocortisone 21-benzoate.

(g) 1-dehydro-6α-methylhydrocortisone with phenylacetyl chloride yielded 1-dehydro-6α-methylhydrocortisone 21-phenylacetate.

(h) 1-dehydro-6α-ethylhydrocortisone with acetic anhydride yielded 1-dehydro-6α-ethylhydrocortisone acetate.

In a manner similar to Preparations 13 and 14, other starting materials can be made by esterifying 1-dehydro-6-alkylhydrocortisone or 1-dehydro-6-arylhydrocortisone in pyridine solution with acyl halides or carboxylic acid anhydrides. In similar manner the esters of 6-alkylhydrocortisone and 6-arylhydrocortisone can be prepared and may be used in the examples of the instant invention. Starting materials thus prepared include the acetates, propionates, butyrates, isobutyrates, valerates, isovalerates, hexanoates, heptanoates, octanoates, benzoates, phenylacetates, β-cyclopentylpropionates, phenylpropionates, laureates, hemisuccinates, tartrates, maleates, toluenesulfonates, and the like of 1-dehydro-6-alkylhydrocortisone and 1-dehydro-6arylhydrocortisone wherein the alkyl group is methyl, ethyl, propyl, butyl, pentyl or hexyl and the aryl group may be phenyl or the like.

EXAMPLE 1

6-Dehydro-6-Methylhydrocortisone 21-Acetate (6-Methyl-11β,17α,21-Trihydroxy-4,6-Pregnadiene-3,20-dione 21-Acetate)

4.0 g. of 6α-methylhydrocortisone 21-acetate (Preparation 6), 6.0 g. of recrystallized 2,3,5,6-tetrachloro-1,4-benzoquinone (chloranil) and 240 ml. of tertiary amyl alcohol were heated to boiling under nitrogen with a few boiling chips, and gently refluxed for 6 hours. The mixture was cooled and evaporated to dryness under reduced pressure. The solid residue (with exception of some chloranil, which is insoluble) was dissolved in about 100 ml. of ether and filtered. The chloranil on the filter paper was washed with several portions of ether and the combined ether filtrates were washed with two 200-ml. portions of cold 2% sodium hydroxide. The ether filtrates were washed with cold water until the washings were neutral, then with saturated sodium chloride solution. The pooled ether solutions were dried over sodium sulfate and evaporated to dryness. The residue crystallized readily from cold acetone to yield 2.65 g. (66.5% of theoretical) of 6-dehydro-6-methylhydrocortisone 21-acetate with a melting point of 133 to 137° C.

*Analysis.*—(Calculated for an acetone solvate which was suggested by a low melting point that remained unchanged after drying for 4 hours at 94 to 100° C. without weight loss. In addition, the infrared absorption spectrum was indicative of an acetone solvate structure.)

Calculated for $C_{24}H_{32}O_6 \cdot C_3H_6O$: C, 68.33; H, 8.07. Found: C, 68.09; H, 8.15.

The ultraviolet absorption spectrum showed a single sharp peak at 290 mμ, $a_M$ 18,825. Optical rotation $[\alpha]_D$ plus 171 degrees in ethanol.

The ester thus obtained can be hydrolyzed with potassium hydroxide or potassium carbonate in methanol or ethanol at room temperature in a nitrogen atmosphere to give the free triol, 6-methyl-11β,17α,21-trihydroxy-4,6-pregnadiene 3,20-dione, M.P. 190–194° C. The triol can be reesterified by reacting it at room temperature in pyridine solution with the anhydride or acyl halide of an organic carboxylic acid.

In a manner similar to that of the foregoing example, substitution of another 6α-methylhydrocortisone 21-acylate as the starting steroid is productive of the corresponding 6-dehydro-6-methylhydrocortisone 21-acylate. Representative compounds thus prepared are 6-dehydro-6-methylhydrocortisone 21-caproate, 6-dehydro - 6 - methylhydrocortisone 21-phenylacetate, 6-dehydro-6-methylhydrocortisone 21-(β-cyclopentylpropionate), 6-dehydro-6-methylhydrocortisone 21-acrylate, 6-dehydro-6-methylhydrocortisone 21-valerate, 6-dehydro-6-methylhydro-cortisone 21-trimethylacetate, 6-dehydro-6-methylhydrocortisone 21-(t-butylacetate), 6-dehydro-6-methylhydrocortisone 21-cyclopentylcarboxylate, 6-dehydro - 6 - methylhydrocortisone 21-ethylbutyrate, 6-dehydro-6-methylcortisone 21-cyclohexylacetate, 6-dehydro-6-methylhydrocortisone 21-(O-toluate), 6-dehydro-6-methylhydrocortisone 21-monoglutarate, 6-dehydro-6-methylhydrocortisone 21-monodiglycolate, 6-dehydro-6-methylhydrocortisone 21-(mono-$\beta,\beta$-dimethylglutarate), 6-dehydro-6-methylhydrocortisone 21-ethoxyacetate, 6-dehydro-6-methylhydrocortisone 21-laurate, 6-dehydro-6-methylhydrocortisone 21-butyrate, 6-dehydro - 6 - methylhydrocortisone 21-propionate, 6-dehydro-6-methylhydrocortisone 21-enanthate, 6-dehydro-6-methylhydrocortisone 21-caprylate and the like.

In the same manner as in Example 1, substitution of 6$\alpha$-methylhydrocortisone as the starting steroid is productive of 6-dehydro-6-methylhydrocortisone.

In the same manner as in Example 1, substitution of 6$\beta$-methylhydrocortisone (Preparation 7) as the starting steroid is productive of 6-dehydro-6-methylhydrocortisone.

EXAMPLE 2

6-Dehydro-6-Methylcortisone 21-Acetate (6-Methyl-17$\alpha$, 21-Dihydroxy - 4,6 - Pregnadiene - 3,11,20 - trione 21-Acetate)

A solution prepared by dissolving 1.0 g. of 6-dehydro-6-methylhydrocortisone 21-acetate in 10 ml. of glacial acetic acid was mixed with a solution of 0.70 g. of sodium dichromate dihydrate in 1.0 ml. of water and allowed to remain at room temperature (22° C.) for 3 hours. The reaction mixture was then diluted with about 25 ml. of cold water and crystallization of the product was allowed to proceed for 30 minutes. The product was collected on a Büchner funnel, washed with water and then dried in a vacuum oven to yield 0.80 g. of 6-dehydro-6-methylcortisone 21-acetate with a melting point of 211.5 to 214° C. Two recrystallizations from ethanol gave an analytical sample as prisms melting at 251 to 252° C. $\lambda$ max. 285 mu, $\epsilon$ 23,400.

Analysis.—Calculated for $C_{24}H_{30}O_6$: C, 69.54; H, 7.30. Found: C, 69.50; H, 7.51.

Another polymorphic form of this substance, obtained from a chloranil dehydrogenation of 6$\alpha$-methylhydrocortisone acetate that was heated 7 hours in toluene, melted at 194–197° C.

The ester thus obtained can be hydrolyzed with potassium hydroxide or potassium carbonate in methanol or ethanol at room temperature in a nitrogen atmosphere to give the free diol, 6-methyl-17$\alpha$,21-dihydroxy-4,6-pregnadiene-3,11,20-trione. The diol can be reesterified by reacting it at room temperature in pyridine solution with the anhydride or acyl halide of an organic carboxylic acid.

In a manner similar to that of the foregoing example, substitution of another 6-dehydro-6-methylhydrocortisone 21-acylate as the starting steroid is productive of the corresponding 6-dehydro - 6 - methylcortisone 21-acylate. Representative 21-acylates thus prepared include the caproate, phenylacetate, $\beta$-cyclopentylpropionate, acrylate, valerate, trimethylacetate, tertiary butylacetate, cyclopentylcarboxylate, ethylbutyrate, cyclohexylacetate, o-toluate, monoglutarate, monodiglycolate, mono-$\beta,\beta$-dimethylglutarate, ethoxyacetate, laurate, butyrate, propionate, enanthate, caprylate and the like of 6-dehydro-6-methylcortisone.

EXAMPLE 3

6-Methyl-17$\alpha$,21-Dihydroxy-4,6,9(11)-Pregnatriene-3,20-dione 21-Acetate

To a solution of 500 mg. of 6-methyl-11$\beta$,17$\alpha$,21-trihydroxy-4,6-pregnadiene-3,20-dione 21-acetate (6-dehydro-6-methylhydrocortisone 21-acetate) in pyridine, in an atmosphere of nitrogen, was added 225 mg. of N-bromoacetamide. After standing at room temperature under nitrogen, the reaction solution was cooled to ten to fifteen degrees centigrade and, with shaking, sulfur dioxide gas was passed over the surface until the solution gave no color with acidified starch-iodine paper. During the addition of sulfur dioxide gas the reaction mixture became warm. The temperature was kept under 30° C., by external cooling and by varying the rate of sulfur dioxide addition. After standing at room temperature for a period of fifteen minutes, the reaction mixture was poured into ice water and the resulting precipitate extracted with ether. The ether extract was washed with 5% hydrochloric acid solution and water, and evaporated to dryness. This material was recrystallized from acetone-Skellysolve B hexanes to give 6-methyl-17$\alpha$,21-dihydroxy-4,6,9(11)-pregnatriene-3,20-dione 21-acetate.

The ester thus obtained can be hydrolyzed with potassium hydroxide or potassium carbonate in methanol or ethanol at room temperature in a nitrogen atmosphere to give the free diol, 6 - methyl - 17$\alpha$,21 - dihydroxy - 4,6, 9(11)-pregnatriene. The diol can be reesterified by reacting it at room temperature in pyridine solution with the anhydride or acyl halide of an organic carboxylic acid.

In the same manner as in the foregoing example, substitution of another 6-dehydro-6-methylhydrocortisone 21-acylate as the starting steroid is productive of the corresponding 6 - methyl - 17$\alpha$,21-dihydroxy-4,6,9(11)-pregnatriene-3,20-dione 21-acylate.

EXAMPLE 4

6 - Methyl-9$\alpha$-Bromo-11$\beta$,17$\alpha$,21-Trihydroxy-4,6-Pregnadiene-3,20-dione 21 - Acetate (6-Dehydro-6-Methyl-9$\alpha$-Bromohydrocortisone 21-Acetate)

To a solution of 300 mg. of 6-methyl-17$\alpha$,21-dihydroxy-4,6,9(11)-pregnatriene-3,20-dione 21-acetate in a 1:2 mixture of methylene chloride and tertiary butyl alcohol was added a solution of 1.0 ml. of 72% perchloric acid in water followed by a solution of 150 mg. of N-bromoacetamide in 2.5 ml. of tertiary butyl alcohol. After stirring the reaction mixture to homogeneity, a solution of 150 mg. of sodium sulfite in 10 ml. of water was added and the reaction mixture was concentrated to a small volume under reduced pressure at about 60° C. At this point, crystallization started. The concentrate was cooled in an ice bath while stirring and water was added. After stirring for several minutes, the crystalline product was isolated by filtration, the crystals were washed with water and air-dried to give 6-methyl-9$\alpha$-bromo-11$\beta$,17$\alpha$,21-trihydroxy-4,6-pregnadiene-3,20-dione 21-acetate (6-dehydro-6-methyl-9$\alpha$-bromohydrocortisone 21-acetate).

EXAMPLE 5

6-Methyl-9$\beta$,11$\beta$-Oxido-17$\alpha$,21-Dihydroxy-4,6-Pregnadiene-3,20-dione 21-Acetate To a solution of 400 mg. of 6-methyl-9$\alpha$-bromo-11$\beta$, 17$\alpha$,21-trihydroxy-4,6-pregnadiene-3,20-dione 21-acetate in acetone was added 400 mg. of potassium acetate and the resulting suspension was heated under reflux for a period of eighteen hours. The mixture was then concentrated to a small volume on the steam bath and thereupon water was added. This caused the potassium acetate to go into solution and the steroidal product to crystallize out. The product was separated by filtration and recrystallized from acetone to give 6-methyl-9$\beta$,11$\beta$-oxido-17$\alpha$,21-dihydroxy-4,6-pregnadiene-3,20-dione 21-acetate.

The ester thus obtained can be hydrolyzed with potassium hydroxide or potassium carbonate in methanol or ethanol at room temperature in a nitrogen atmosphere to give the free diol, 6-methyl-9$\beta$,11$\beta$-oxido-17$\alpha$,21-dihydroxy-4,6-pregnadiene-3,20-dione. The diol can be reesterified by reacting it at room temperature in pyridine solution with the anhydride or acyl halide of an organic carboxylic acid.

In the same manner as in the foregoing example, substitution of another 6-methyl-9α-bromo-11β,17α,21-trihydroxy-4,6-pregnadiene-3,20-dione 21-acylate as the starting steroid is productive of the corresponding 6-methyl - 9β,11β - oxido - 17α,21 - dihydroxy - 4,6 - pregnadiene-3,20-dione 21-acylate.

EXAMPLE 6

*6 - Methyl - 9α - Fluoro - 11β,17α,21 - Trihydroxy - 4,6-Pregnadiene - 3,20 - dione 21 - Acetate (6-Dehydro-6-Methyl-9α-Fluorohydrocortisone 21-Acetate)*

To a solution of 250 mg. of 6-methyl-9β,11β-oxido-17α,21-dihydroxy-4,6-pregnadiene-3,20-dione 21-acetate in five ml. of methylene chloride was added about 1 ml. of a 48% solution of hydrogen fluoride. The two-phase mixture was stirred, then diluted with methylene chloride and carefully poured into water containing sodium bicarbonate. After shaking to neutralize the excess hydrogen fluoride, the methylene chloride was separated and the water phase was extracted with more methylene chloride. The combined methylene chloride solution was dried over anhydrous sodium sulfate, diluted with ether and chromatographed over a column of Florisil synthetic magnesium silicate. The column was eluted and fractionated with mixtures of methylene chloride-ether and Skellysolve B hexane-acetone. The desired fractions were combined, evaporated and the residue thus obtained recrystallized from acetone-Skellysolve B hexane and from methylene chloride to give 6-methyl-9α-fluoro-11β,17α,21-trihydroxy-4,6-pregnadiene-3,20-dione 21-acetate (6-dehydro-6-methyl-9α-fluorohydrocortisone 21-acetate).

The ester thus obtained can be hydrolyzed with potassium hydroxide or potassium carbonate in methanol or ethanol at room temperature in a nitrogen atmosphere to give the free triol, 6-methyl-9α-fluoro-11β,17α,21-trihydroxy-4,6-pregnadiene-3,20-dione (6-dehydro-6-methyl-9α-fluorohydrocortisone). The triol can be reesterified by reacting it at room temperature in pyridine solution with the anhydride or acyl halide of an organic carboxylic acid.

In the same manner as in the foregoing example, substitution of another 6-methyl-9β,11β-oxido-17α,21-dihydroxy-4,6-pregnadiene-3,20-dione 21-acylate is productive of the corresponding 6-methyl-9α-fluoro-11β,17α,21-trihydroxy-4,6-pregnadiene-3,20-dione 21-acylate (6-dehydro-6-methyl-9α-fluorohydrocortisone 21-acylate).

In the same manner as in Example 6, but substituting hydrogen chloride for hydrogen fluoride, there is thus produced 6-methyl-9α-chloro-11β,17α,21-trihydroxy-4,6-pregnadiene-3,20-dione 21-acylate, which on subsequent hydrolysis with potassium hydroxide or potassium carbonate in methanol or ethanol at room temperature in a nitrogen atmosphere yields 6-dehydro-6-methyl-9α-chlorohydrocortisone.

EXAMPLE 7

*6 - Methyl - 9α - Fluoro - 17α,21 - Dihydroxy - 4,6-Pregnadiene-3,11,20-trione 21-Acetate (6-Dehydro-6-Methyl-9α-Fluorocortisone 21-Acetate)*

A solution was prepared containing in 1 ml. of acetic acid 50 mg. of 6-methyl-9α-fluoro-11β,17α,21-trihydroxy-4,6-pregnadiene-3,20-dione 21-acetate, 20 mg. of chromic anhydride and one drop of water. This mixture was shaken several times at room temperature and allowed to stand for several hours. Thereafter it was poured into water and refrigerated for about one day at about 5° C. The steroid which separated from the aqueous mixture was collected on filter paper and recrystallized two times from acetone to give 6-methyl-9α-fluoro-17α,21-dihydroxy-4,6-pregnadiene-3,11,20-trione 21-acetate (6-dehydro-6-methyl-9α-fluorocortisone 21-acetate).

The ester thus obtained can be hydrolyzed with potassium hydroxide or potassium carbonate in methanol or ethanol at room temperature in a nitrogen atmosphere to give the free diol, 6-methyl-9α-fluoro-17α,21-dihydroxy-4,6-pregnadiene-3,11,20 - trione (6 - dehydro - 6-methyl-9α-fluorocortisone). The diol can be reesterified by reacting it at room temperature in pyridine solution with the anhydride or acyl halide of an organic carboxylic acid.

In the same manner as in the foregoing example, substitution of another 6-methyl-9α-fluoro-11β,17α,21-trihydroxy-4,6-pregnadiene-3,20-dione 21-acylate as the starting steroid is productive of the corresponding 6-methyl - 9α - fluoro - 17α,21 - dihydroxy - 4,6 - pregnadiene-3,11,20-trione 21-acylate (6-dehydro-6-methyl-9α-fluorocortisone 21-acylate).

EXAMPLE 8

*6 - Methyl - 9α - Fluoro - 11β,17α,21 - Trihydroxy - 4,6-Pregnadiene - 3,20 - dione (6 - Dehydro - 6 - Methyl-9α-Fluorohydrocortisone)*

100 mg. of 6-methyl-9α-fluoro-11β,17α,21-trihydroxy-4,6-pregnadiene-3,20-dione 21-acetate was dissolved in a solution consisting of 2 ml. of methanol and 0.1 ml. of water, previously purged of air-oxygen by passing nitrogen through it, and thereto was added fifty mg. of potassium carbonate. The mixture was allowed to stand at room temperature for a period of six hours in a nitrogen atmosphere, thereupon neutralized with 5% aqueous hydrochloric acid solution, diluted with water and refrigerated. The mixture was then filtered and the solids recrystallized from acetone-Skellysolve B hexanes to give pure 6-methyl-9α-fluoro-11β,17α,21-trihydroxy-4,6-pregnadiene-3,20-dione (6-dehydro-6-methyl-9α-fluorohydrocortisone).

EXAMPLE 8a

*6 - Methyl - 9α - Fluoro - 17α21 - Dihydroxy - 4,6 - Pregnadiene - 3,11,20 - trione (6 - Dehydro - 6 - Methyl-9α-Fluorocortisone)*

In the manner given in Example 8, hydrolyzing 6-methyl - 9α - fluoro - 17α,21 - dihydroxy - 4,6 - pregnadiene-3,11,20-trione 21-acetate with potassium hydroxide in methanol yielded 6-methyl-9α-fluoro-17α,21-dihydroxy-4,6-pregnadiene-3,11,20-trione (6-dehydro-6α-methyl-9α-fluorocortisone).

EXAMPLE 9

*6 - Methyl - 9α - Fluoro - 11β,17α,21 - Trihydroxy - 4,6-Pregnadiene-3,20 - dione 21-Benzoate (6-Dehydro-6-Methyl-9α-Fluorohydrocortisone 21-Benzoate)*

A solution was prepared containing 6-methyl-9α-fluoro-11β,17α,21-trihydroxy-4,6-pregnadiene-3,20-dione in benzoyl chloride. The mixture was allowed to stand for a period of about eighteen hours and was thereupon diluted with water. The water solution was extracted three times with methylene chloride, the methylene chloride fractions combined, washed with water, dried over anhydrous sodium sulfate and evaporated to give a residue. This residue was recrystallized from methanol to give 6 - methyl - 9α - fluoro - 11β,17α,21 - trihydroxy - 4,6-pregnadiene-3,20-dione 21-benzoate.

EXAMPLE 10

*6 - Methyl - 9α - Fluoro - 11β,17α,21 - Trihydroxy - 4,6-Pregnadiene-3,20-dione 21-Hemisuccinate (6-Dehydro-6-Methyl-9α-Fluorohydrocortisone 21-Hemisuccinate)*

A solution was prepared containing succinic anhydride and 6 - methyl - 9α - fluoro - 11β,17α,21 - trihydroxy - 4,6-pregnadiene-3,20-dione in pyridine. The solution was allowed to stand for a period of about twenty hours, was thereupon diluted with water and the mixture refrigerated and filtered. The precipitate thus collected on filter paper was recrystallized two times from methanol to give 6 - methyl - 9α - fluoro - 11β,17α,21 - trihydroxy - 4,6-pregnadiene-3,20-dione 21-hemisuccinate.

Example 11

6 - Methyl - 11β,17α,21 - Trihydroxy - 4,6 - Pregnadiene-3,20-dione 21-Methanesulfonate (6-Dehydro-6-Methylhydrocortisone 21-Methanesulfonate)

A solution was prepared containing 6-dehydro-6-methylhydrocortisone in pyridine. This solution was cooled to 0° C. and treated with a cooled solution of methanesulfonyl chloride in pyridine. Thereafter the solution was allowed to stand at a temperature between 0 and 5° C. for a period of several hours. Thereafter ice and sufficient dilute hydrochloric acid to neutralize the pyridine was added and the mixture extracted with several portions of methylene chloride. The extracts were combined, washed with cold sodium bicarbonate solution, then water and finally dried over anhydrous sodium sulfate and evaporated at reduced pressure to give crystalline 6-methyl - 11β,17α,21 - trihydroxy - 4,6 - pregnadiene-3,20-dione 21-methanesulfonate.

Example 12

6-Methyl-11β,17α-Dihydroxy-21-Iodo-4,6-Pregnadiene 3,20-dione

The crystalline methanesulfonate of 6-methyl-11β,17α,21-trihydroxy-4,6-pregnadiene-3,20-dione of Example 11 was dissolved in acetone and treated with a solution of sodium iodide in acetone. The mixture was heated under reflux with stirring for a period of fifteen minutes. The heating was then discontinued and the mixture concentrated to dryness at reduced pressure to give 6-methyl-11β,17α - dihydroxy - 21 - iodo - 4,6 - pregnadiene - 3,20-dione.

Example 13

6 - Methyl - 11β,17α - Dihydroxy - 4,6 - Pregnadiene - 3,20 - dione (6 - Dehydro - 6 - Methyl - 21 - Desoxyhydrocortisone)

The crude 6-methyl-11β,17α-dihydroxy-21-iodo-4,6-pregnadiene-3,20-dione was slurried with acetic acid and stirred for a period of 45 minutes. Thereafter was added an aqueous solution of sodium thiosulfate pentahydrate causing the iodine color to disappear. Additional water was added and the mixture extracted with several portions of methylene chloride. The methylene chloride extracts were combined, washed with water and cold sodium bicarbonate solution until all acetic acid was neutralized. After drying over anhydrous sodium sulfate, the solution was concentrated and chromatographed over a column of Florisil synthetic magnesium silicate. The column was eluted and fractionated with mixtures of acetone and Skellysolve B hexanes.

The desired fractions were combined and evaporated to give crystals which after recrystallization from acetone-Skellysolve B hexanes yielded 6-methyl-11β,17α-dihydroxy-4,6-pregnadiene-3,20-dione.

Example 14

6 - Methyl - 17α - Hydroxy - 4,6 - Pregnadiene - 3,11,20-trione (6-Dehydro-6-Methyl-21-Desoxycortisone)

A mixture was prepared containing 0.3 g. of 6-methyl-11β,17α-dihydroxy-4,6-pregnadiene-3,20-dione, 100 mg. of chromic anhydride, 10 ml. of glacial acetic acid and a small amount of water. This mixture was stirred and thereupon maintained for eight hours at room temperature. Thereafter the mixture was poured into ice water, neutralized by the addition of dilute sodium hydroxide and the thus obtained precipitate collected on a filter and three times recrystallized from ethyl acetate and Skellysolve B hexanes to give 6-methyl-17α-hydroxy-4,6-pregnadiene-3,11,20-trione.

Example 15

6-Ethyl-11β,17α,21-Trihydroxy-4,6-Pregnadiene-3,20-dione 21-Toluenesulfonate

In the same manner given in Example 11, 6-dehydro-6-ethylhydrocortisone, dissolved in pyridine, was treated with toluenesulfonyl chloride to give 6-ethyl-11β,17α,21 - trihydroxy - 4,6 - pregnadiene - 3,20 - dione 21 - toluenesulfonate.

Example 16

6-Ethyl-11β,17α-Dihydroxy-21-Iodo-4,6-Pregnadiene 3,20-dione

In the same manner given in Example 12, refluxing 6-ethyl - 11β,17α,21 - trihydroxy - 4,6 - pregnadiene - 3,20-dione 21-toluenesulfonate with sodium iodide in acetone yielded 6 - ethyl - 11β,17α - dihydroxy - 21 - iodo - 4,6-pregnadiene-3,20-dione.

Example 17

6-Ethyl-11β,17α-Dihydroxy-4,6-Pregnadiene-3,20-dione

To a solution of 6-ethyl-11β,17α-dihydroxy-21-iodo-4,6-pregnadiene-3,20-dione in 50% aqueous acetic acid was added an excess of sodium bisulfite and the mixture was stirred for an hour at room temperature. Thereafter the mixture was poured into excess of water and extracted with methylene chloride. The methylene chloride extracts were combined, washed with water, sodium bicarbonate solution, then water again, dried over anhydrous sodium sulfate and evaporated to give crude 6-ethyl-11β,17α-dihydroxy-4,6-pregnadiene-3,20-dione which was purified by recrystallization from acetone-Skellysolve B hexanes to give the pure 6-ethyl-11β,17α-dihydroxy-4,6-pregnadiene-3,20-dione.

Example 18

6-Ethyl-17α-Hydroxy-4,6-Pregnadiene 3,11,20-trione

To 200 mg. of 6-ethyl-11β,17α-dihydroxy-4,6-pregnadiene-3,20-dione in methanol was added pyridine, water and 150 mg. of N-bromoacetamide. The reaction mixture was kept at room temperature for a period of about one day and then dilute sodium sulfite solution was added to destroy excess N-bromoacetamide. The mixture was thereupon concentrated until copious crystallization occurred. The mixture was then cooled to 0° C. and kept at this temperature for a period of about one hour, filtered, and the thus obtained crystalline precipitate recrystallized from acetone-Skelly-solve B hexane solution to yield pure 6-ethyl-17α-hydroxy-4,6-pregnadiene-3,11,20-trione.

Example 19

6-Methyl-17α-Hydroxy-4,6-Pregnadiene-3,11,20-Trione

In the same manner shown in Example 11, treating 6-dehydro-6-methylcortisone with methanesulfonyl chloride in pyridine solution yielded 6-methyl-17α,21-dihydroxy-4,6-pregnadiene-3,11,20-trione 21-methanesulfonate; refluxing in the manner given in Example 12, 6-methyl-17α,21-dihydroxy-4,6-pregnadiene-3,11,20-trione 21-methanesulfonate with potassium iodide in acetone yielded 6-methyl-17α-hydroxy-21-iodo-4,6 - pregnadiene - 3,11,20-trione and reducing with sodium thiosulfate the 6-methyl-17α-hydroxy-21-iodo-4,6-pregnadiene - 3,11,20 - trione as shown in Example 13 yielded 6-methyl-17α-hydroxy-4,6-pregnadiene-3,11,20-trione.

Example 20

In the same manner shown in Example 11, treating other 6-dehydro-6-aryl or alkylhydrocortisones and 6-dehydro-6-aryl or alkylcortisones with the chlorides or bromides of toluenesulfonic acid, methanesulfonic acid and other organic sulfonic acids, give the corresponding 21-toluenesulfonate, the 21-methanesulfonate, or the like, of the corresponding 6-dehydro-6-aryl or alkylhydrocortisone and 6-dehydro-6-aryl or alkylcortisone wherein the alkyl group is methyl, ethyl, propyl, isopropyl, butyl, isobutyl, pentyl, hexyl, phenyl, or the like.

Treating the thus obtained 21-toluenesulfonate, 21-methanesulfonate or other 21-alkyl or 21-arylsulfonates of 6-dehydro-6-alkylhydrocortisone and 6-dehydro-6-alkylcortisone or the 6-dehydro-6-aryl analogues thereof with sodium or potassium iodide in acetone at elevated temperature, usually reflux temperature, yields the corresponding 21-iodo compound, such as, for example, 6-propyl-11β,17α-dihydroxy-4,6-pregnadiene-3,20-dione,
6-isopropyl-11β,17α-dihydroxy - 4,6 - pregnadiene - 3,20-dione,
6-butyl-11β,17α-dihydroxy-21-iodo-4,6-pregnadiene - 3,20-dione,
6-isobutyl-11β,17α-dihydroxy-4,6-pregnadiene-3,20-dione,
6-pentyl-11β,17α-dihydroxy-4,6-pregnadiene-3,20-dione,
6-phenyl-11β,17α-dihydroxy - 21 - iodo-4,6 - pregnadiene-3,20-dione,
6-methyl-17α-hydroxy-21-iodo-4,6-pregnadiene - 3,11,20-trione,
6-ethyl-17α-hydroxy-21-iodo-4,6-pregnadiene-3,11,20 - trione,
6-propyl-17α-hydroxy-21-iodo-4,6 - pregnadiene - 3,11,20-trione,
6-isopropyl-17α-hydroxy-21-iodo-4,6-pregnadiene-3,11,20-trione,
6-butyl-17α-hydroxy-21-iodo-4,6-pregnadiene-3,11,20 - trione,
6-isobutyl-17α-hydroxy-21-iodo-4,6-pregnadiene - 3,11,20-trione,
6-pentyl-17α-hydroxy-21-iodo-4,6 - pregnadiene - 3,11,20-trione,
6 - hexyl - 17α - hydroxy-21-iodo-4,6-pregnadiene-3,11,20-trione,
6-phenyl-17α-hydroxy-21-iodo-4,6-pregnadiene - 3,11,20-trione, and the like.

Treating the thus obtained 6-aryl or alkyl-11β,17α-dihydroxy-21-iodo-4,6-pregnadiene-3,20-diones and 6-aryl or alkyl-17α-hydroxy-21-iodo-4,6-pregnadiene-3,11,20-triones with a reducing agent, such as, zinc in acetic acid, sodium bisulfite, sodium or potassium thiosulfate produces the corresponding 6-aryl or alkyl-11β,17α-dihydroxy-4,6-pregnadiene-3,20-diones and 6-aryl or alkyl-17α-hydroxy-4,6-pregnadiene-3,11,20-triones wherein the alkyl group is ethyl, propyl, isopropyl, butyl, isobutyl, pentyl, hexyl, or aryl, such as, phenyl, or the like.

Example 21

*6-Methyl-9α-Fluoro-11β,17α-Dihydroxy-4,6-Pregnadiene-3,20-dione (6-Dehydro-6-Methyl-9α-Fluoro-21-Desoxyhydrocortisone)*

A mixture of 1 g. of 6-methyl-11β,17α-dihydroxy-4,6-pregnadiene-3,20-dione, 650 mg. of N-bromoacetamide and 6 ml. of pyridine were stirred in the dark for about thirty minutes. The mixture was cooled in an ice-water bath and a stream of sulfur dioxide was directed onto the surface of the stirred mixture until a negative potassium iodide-starch test was obtained. Water was then added to the mixture and the mixture was maintained at about 5° C. for about thirty minutes. The precipitated white solid was filtered, washed with water and dried under vacuum. After crystallization from acetone, there was obtained pure 6-methyl-17α-hydroxy-4,6,9(11)-pregnatriene-3,20-dione.

0.5 g. of 6-methyl-17α-hydroxy-4,6,9(11)-pregnatriene-3,20-dione was dissolved in methylene chloride and thereto was added a solution of 1 ml. of 71% perchloric acid in water and 200 mg. of N-bromoacetamide in tertiary butyl alcohol. The solution was maintained at room temperature for about fifteen minutes and then mixed with a solution of 0.3 g. of sodium sulfite in water. The mixture was distilled at reduced pressure until the residual solution became cloudy. The product was then precipitated by the addition of 100 ml. of a mixture of ice-water. The white crystalline precipitate was filtered, washed with water and then dried and recrystallized from a mixture of acetone and Skellysolve B hexane hydrocarbons to give 6-methyl-9α-bromo-11β,17α-dihydroxy-4,6-pregnadiene-3,20-dione.

A mixture of 0.45 g. of 6-methyl-9α-bromo-11β,17α-dihydroxy-4,6-pregnadiene-3,20-dione, 0.45 g. of anhydrous potassium acetate and 20 ml. of acetone was heated at its refluxing temperature for a period of about five hours. The mixture was then cooled and poured into water and extracted with methylene chloride. The methylene chloride extract was dried and poured over a column of Florisil synthetic magnesium silicate. The column was developed with Skellysolve B hexane hydrocarbons containing increasing portions of acetone. The Skellysolve B plus 10% acetone eluate contained 6-methyl-9(11)-oxido-17α-hydroxy-4,6-pregnadiene-3,20-dione.

A solution of 1 g. of 6-methyl-9,(11)-oxido-17α-hydroxy-4,6-pregnadiene-3,20-dione was dissolved in 50 ml. of methylene chloride and thereto was added an excess of 48% hydrofluoric acid and 0.5 ml. of 71% perchloric acid. The mixture was stirred vigorously for approximately six hours and then poured into an excess of cold aqueous 5% sodium bicarbonate solution. The methylene chloride layer was separated, dried with anhydrous sodium sulfate and then poured over a column of Florisil synthetic magnesium silicate. The column was developed with Skellysolve B hexanes and acetone, the fractions containing 10% acetone were recrystallized from acetone and Skellysolve B hexanes to give pure 6-methyl-9α-fluoro-11β,17α-dihydroxy-4,6-pregnadiene-3,20-dione.

Following the procedure described in Example 21, but substituting other 6-aryl ar alkyl-11β,17α-dihydroxy-4,6-pregnadiene-3,20-diones for the 6-methyl-11β,17α-dihydroxy-4,6-pregnadiene-3,20-dione wherein the alkyl radical is ethyl, propyl, isopropyl, butyl, isobutyl, pentyl, hexyl, or an aryl, such as, phenyl, or the like results in the corresponding 6-aryl or alkyl - 9α - fluoro-11β,17α-dihydroxy-4,6-pregnadiene-3,20-dione wherein the alkyl group will be ethyl, propyl, isopropyl, butyl, isobutyl, pentyl, hexyl, or an aryl, such as phenyl, or the like.

Example 22

*6-Methyl - 9α - Fluoro - 17α - Hydroxy-4,6-Pregnadiene-3,11,20-Trione*

Oxidizing in the manner given in Example 18, 6-methyl-9α-fluoro - 11β,17α - dihydroxy - 4,6 - pregnadiene-3,20-dione with N-bromoacetamide in pyridine solution produces 6-methyl-9α-fluoro - 17α - hydroxy-4,6-pregnadiene-3,11,20-trione.

In the same manner given in Example 22, oxidizing with N-bromoacetamide in pyridine solution or according to Example 14 with chromic anhydride in acetic acid solution, other 6-alkyl- or 6-aryl-9α-fluoro-11β,17α-dihydroxy-4,6-pregnadiene-3,20-dione results in the corresponding 6-aryl or alkyl-9α-fluoro-17α-hydroxy - 4,6 - pregnadiene-3,11,20-triones wherein the alkyl group is ethyl, propyl, isopropyl, butyl, isobutyl, pentyl, hexyl, or aryl, such as, phenyl, or the like.

Example 23

*6-Methyl - 9α - Fluoro-11β,17α,21-Trihydroxy-4,6-Pregnadiene - 3,20 - Dione 21-Methanesulfonate (6-Dehydro - 6 - Methyl-9α-Fluorohydrocortisone 21-Methanesulfonate)*

To a solution of 6-methyl-9α-fluoro-11β,17α,21-trihydroxy-4,6-pregnadiene-3,20-dione (prepared in accordance with the procedures of Examples 1, 3, 4, 5, 6, and 8 herein) in pyridine previously cooled to 0 to 5° C. was added an excess of methanesulfonyl chloride. The reaction mixture was stirred at 0 to 5° C. for approximately 17 hours, and was then poured into cold 5% hydrochloric acid to precipitate the solid mesylate. The product, after filtration can be used in the next step without further purification.

Example 24

*6-Methyl - 9α,21 - Difluoro - 11β,17α - Dihydroxy-4,6-Pregnadiene - 3,20 - Dione (6-Dehydro-6-Methyl-9α,21-Difluoro - 21 - Desoxyhydrocortisone)*

A mixture fo 0.5 g. of 6-methyl-9α-fluoro-11β,17α,21- trihydroxy - 4,6 - pregnadiene - 3,20 - dione 21-methanesulfonate and 0.37 g. of potassium fluoride in dimethylsulfoxide was stirred and heated on a steam bath for about 17 hours. The reaction mixture was then cooled, poured into water, and extracted with several portions of ethyl acetate. After drying over sodium sulfate, the ethyl acetate solution was evaporated to dryness and the residue was purified by chromatography over a column of synthetic magnesium silicate and crystallization from acetone-Skellysolve B hexanes to give 6-methyl-9α,21-difluoro-11β,17α-dihydroxy-4,6-pregnadiene-3,20-dione.

EXAMPLE 25

*6-Methyl - 9α,21 - Difluoro - 11β,17α - Dihydroxy-4,6-Pregnadiene - 3,20 - Dione (6-Dehydro - 6 - Methyl-9α,21-Difluoro - 21 - Desoxyhydrocortisone)*

To a solution of 0.5 g. of 6-methyl-9α-fluoro-11β,17α-21-trihydroxy - 4,6 - pregnadiene-3,20-dione 21-methanesulfonate in acetone was added a solution of 0.65 g. of sodium iodide in acetone. The mixture was allowed to reflux on the steam bath for about ten minutes and was then concentrated to dryness under reduced pressure. The resulting 21-iodide was dissolved in acetonitrile at 50 to 60° C., in the dark, and was treated with 0.4 ml. of 50% aqueous solution of silver fluoride. Addition of silver fluoride was in three equal portions at one-half hour intervals. After maintaining at this temperature for a few hours, the temperature was lowered to 40 to 50° C. for an additional several hours. The solvent was then removed under reduced pressure at 50° C. and the black residue was digested with several portions of acetone. The product, contained in the acetone solution, was purified by chromatography over a column of synthetic magnesium silicate and crystallized from acetone-Skellysolve B hexanes to give crystalline 6-dehydro-6-methyl-9α,21-difluoro 21-desoxyhydrocortisone.

EXAMPLE 26

*6-Methyl - 21 - Fluoro - 9α - Chloro - 11β,17α - Dihydroxy - 4,6 - Pregnadiene - 3,20 - Dione (6-Dehydro-6-Methyl-21-Fluoro - 9α - Chloro - 21 - Desoxyhydrocortisone)*

Following the procedures of Examples 23, 24 and 25 but substituting 6-dehydro-6-methyl-9α-chlorohydrocortisone (Example 6) as starting material therein is productive of 6-dehydro - 6 - methyl-21-fluoro-9α-chloro-21-desoxyhydrocortisone.

EXAMPLE 27

*6-Methyl - 21 - Fluoro - 9α - Bromo-11β,17α-Dihydroxy-4,6-Pregnadiene - 3,20 - Dione (6-Dehydro-6-Methyl-21-Fluoro-9α-Bromo-21-Desoxyhydrocortisone)*

Following the procedures of Examples 23, 24, and 25 but substituting 6-dehydro-6-methyl-9α-bromohydrocortisone as starting material is productive of 6-dehydro-6-methyl-21-fluoro - 9α - bromo - 21 - desoxyhydrocortisone.

EXAMPLE 28

*6-Methyl - 9α,21 - Difluoro - 17α - Hydroxy-4,6-Pregnadiene - 3,11,20 - Trione (6-Dehydro-6-Methyl-9α,21-Difluoro-21-Desoxycortisone)*

A solution is prepared containing 0.5 g. of 6-methyl-9α,21-difluoro - 11β,17α - dihydroxy - 4,6 - pregnadiene-3,20-dione, 0.15 g. of chromium trioxide, 10 ml. of glacial acetic acid and a small amount of water. This mixture is stirred and maintained at room temperature for eight hours. Thereafter, the excess oxidant is destroyed by addition of methanol and the mixture is poured into ice water. The resulting precipitate is collected on a filter and recrystallized from ethyl acetate to give 6-methyl-9α-21-difluoro - 17α - hydroxy - 4,6 - pregnadiene-3,11,20-trione.

EXAMPLE 29

*6-Methyl - 9α,21 - Difluoro - 17α - Hydroxy-4,6-Pregnadiene - 3,11,20 - Trione (6-Dehydro-6-Methyl-9α,21-Difluoro - 21 - Desoxycortisone)*

In the same manner shown in Example 23, treating 6-methyl - 9α - fluoro - 17α,21 - dihydroxy-4,6-pregnadiene-3,11,20-trione with methanesulfonyl chloride in pyridine solution yields 6-methyl-9α-fluoro-17α,21-dihydroxy-4,6-pregnadiene-3,11,20-trione 21-methanesulfonate. In the same manner as shown in Example 24, heating the said 21-methanesulfonate with potassium fluoride in dimethylsulfoxide is productive of 6-methyl-9α,21-difluoro-17α-hydroxy-4,6-pregnadiene-3,11,20-trione.

EXAMPLE 30

*6-Methyl - 21 - Fluoro - 9α - Chloro - 17α - Hydroxy-4,6-Pregnadiene-3,11,20-Trione (6-Dehydro - 6 - Methyl-21-Fluoro-9α-Chloro-21-Desoxycortisone)*

Following the procedure of Example 28, oxidation of 6-dehydro - 6 - methyl-21-fluoro-9α-chloro-21-desoxyhydrocortisone of Example 26 is productive of 6-dehydro-6-methyl-21-fluoro-9α-chloro-21-desoxycortisone.

Alternatively, 6-dehydro-6-methyl-21-fluoro-9α-chloro-21-desoxycortisone is prepared by following the procedures of Examples 23 and 24 and substituting 6-dehydro-6-methyl-9α-chlorocortisone as starting material therein.

EXAMPLE 31

*6-Methyl-21-Fluoro-9α-Bromo-17α-Hydroxy - 4,6 - Pregnadiene-3,11,20-Trione (6 - Dehydro - 6 - Methyl - 21-Fluoro-9α-Bromo-21-Desoxycortisone)*

Following the procedure of Example 28, oxidation of 6-dehydro-6 - methyl - 21 - fluoro-9α-bromo-21-desoxyhydrocortisone of Example 27 is productive of 6-dehydro-6-methyl-21-fluoro-9α-bromo-21-desoxycortisone.

Alternatively, 6-dehydro-6-methyl-21-fluoro-9α-bromo-21-desoxycortisone is prepared by following the procedures of Examples 23 and 24 and substituting 6-dehydro-6-methyl-9α-bromocortisone as starting material.

EXAMPLE 32

*1,6 - Bisdehydro - 6 - Methylhydrocortisone (6-Methyl-11β-17α-21-Trihydroxy-1,4,6-Pregnatriene-3,20-Dione)*

Six 100-ml. portions of a medium in 250-ml. Erlenmeyer flasks containing 1% glucose, 2% corn steep liquor (60% solids) and tap water was adjusted to a pH of 4.9. This medium was sterilized for 45 minutes at fifteen pounds per square inch pressure and inoculated with a one to two-day growth of *Septomyxa affinis* A.T.C.C. 6737. The Erlenmeyer flasks were shaken at room temperature at about 24° C. for a period of three days. At the end of this period, this 600-ml. volume was used as an inoculum for 10 l. of the same glucose-corn steep liquor medium which, in addition, contained 10 ml. of an antifoam (a mixture of lard oil and octadecanol). The fermentor was placed into the water bath, adjusted to 28° C., and the contents stirred (300 r.p.m.) and aerated (0.5 l. air per minute/10 l. beer). After seventeen hours of incubation, when a good growth developed and the acidity rose to pH 6.7, 1 g. of 6-dehydro-6-methylhydrocortisone plus 0.5 g. of 3-ketobisnor-4-cholen-22-al, dissolved in 115 ml. of dimethylformamide, was added and the incubation (conversion) carried out at the same temperature and aeration for 24 hours (final pH 7.9). The mycelium was filtered off and the steroidal material was extracted with ethyl acetate to remove the bioconversion products. The ethyl acetate extract was washed with water, dried over sodium sulfate and evaporated to dryness. The residue was taken up in about 100 ml. of methylene chloride and chromatographed over a column of 120 g. of Florisil synthetic magnesium silicate. The products were eluted from the column as follows:

| Fraction | Solvent | Amt. Eluted, g. |
|---|---|---|
| 1 | 5% Acetone in Skellysolve B | 0.769 |
| 2 | do | 1.193 |
| 3 | do | .458 |
| 4 | 10% Acetone in Skellysolve B | .272 |
| 5 | do | .492 |
| 6 | do | .327 |
| 7 | do | .236 |
| 8 | do | .180 |
| 9 | 15% Acetone in Skellysolve B | .164 |
| 10 | do | .199 |
| 11 | do | .149 |
| 12 | do | .111 |
| 13 | do | .094 |
| 14 | do | .084 |
| 15 | 20% Acetone in Skellysolve B | .099 |
| 16 | do | .142 |
| 17 | do | .110 |
| 18 | do | .073 |
| 19 | do | .052 |
| 20 | do | .029 |

The substances eluted by 20% acetone in Skellysolve B consisted of partially purified product, which was further purified by recrystallization from acetone to give 9 mg. of crystals melting at 221 to 222° C. An infrared absorption spectrum of the partially purified product from the chromatographed column showed bands in agreement with those to be expected for 1,6-bisdehydro-6-methylhydrocortisone. A paper chromatogram obtained from the purified product indicated that it was essentially pure 1,6-bisdehydro-6-methylhydrocortisone. For comparison, an authentic sample of 6-dehydro-6-methylhydrocortisone 21-acetate was saponified to give the corresponding free 21-alcohol. A solution of 0.40 g. of 6-dehydro-6-methylhydrocortisone 21-acetate and 0.123 g. of anhydrous potassium acetate in 50 ml. of oxygen-free methanol was refluxed for 3 hours. The solvent was removed under reduced pressure, and the solid residue was washed with water and dried in a vacuum oven at 70° C. to give a practically quantitative yield of the free 21-alcohol, 6-dehydro-6-methylhydrocortisone. The paper chromatogram of this compound was different from that obtained from the product of the biological dehydrogenation, 1,6-bisdehydro-6-methylhydrocortisone.

In the same manner as in Example 32, substitution of 6-dehydro-6-methylhydrocortisone 21-acetate as the starting steroid is productive of 1,6-bisdehydro-6-methylhydrocortisone.

EXAMPLE 33

*1,6-Bisdehydro-6-Methylcortisone (6-Methyl-17α,21-Dihydroxy-1,4,6-Pregnatriene-3,11,20-Trione)*

In the same manner as in Example 32, fermenting with *Septomyxa affinis* in a nutrient medium with 3-ketobisnor-4-cholen-22-al as promoter, 6-dehydro-6-methylcortisone yielded 1,6-bisdehydro-6-methylcortisone.

In the same manner as in Example 33, substitution of 6-dehydro-6-methylcortisone 21-acetate as the starting steroid is productive of 1,6-bisdehydro-6-methylcortisone.

EXAMPLE 34

In the same manner as in Example 32, fermenting the compounds obtained in Examples 1 through 31 with *Septomyxa affinis* in a nutrient medium with 3-ketobisnor-4-cholen-22-al as promoter, yield the corresponding 1-dehydro products.

It is to be understood that the invention is not to be limited to the exact details of operation or exact compounds shown and described, as obvious modifications and equivalents will be apparent to one skilled in the art. The invention is therefore to be limited only by the scope of the appended claims.

We claim:
1. 6-dehydro-6-methylhydrocortisone.
2. 6 - dehydro - 6 - methylhydrocortisone 21 - acylates, wherein the acyl radical is that of a hydrocarbon carboxylic acid containing from one to twelve carbon atoms, inclusive.
3. 6-dehydro-6-methylhydrocortisone 21-acetate.
4. 6-dehydro-6-methyl-9α-fluorohydrocortisone.
5. 6-dehydro-6 - methyl - 9α - fluorohydrocortisone 21-acetate.
6. 6-dehydro-6-methyl-21-desoxycortisone.
7. 6-dehydro-6-methyl-21-desoxyhydrocortisone.
8. 6-dehydro-6-methyl-9α-fluoro-21desoxycortisone.
9. 6-dehydro-6-methyl-9α-fluoro-21-desoxyhydrocortisone.
10. A compound selected from the group consisting of 6-methyl-11,17α-dioxygenated - 1,4,6 - pregnatriene represented by the following formula:

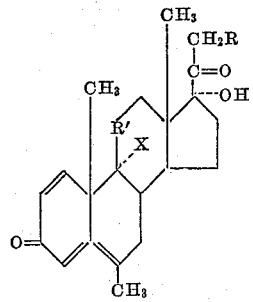

wherein X is selected from the group consisting of hydrogen and fluorine, R' is selected from the group consisting of the carbonyl radical (>C=O) and the β-hydroxymethylene radical

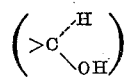

and R is selected from the group consisting of hydrogen, hydroxy, fluorine and the acyl radical of a hydrocarbon carboxylic acid containing from one to twelve carbon atoms, inclusive.

11. 1,6-bisdehydro-6-methylcortisone.
12. 1,6 - bisdehydro - 6 - methylcortisone 21 - acylates, wherein the acyl radical is that of a hydrocarbon carboxylic acid containing from one to twelve carbon atoms, inclusive.
13. 1,6-bisdehydro-6-methylhydrocortisone.
14. 1,6-bisdehydro-6-methylhydrocortisone 21-acylates, wherein the acyl radical is that of a hydrocarbon carboxylic acid containing from one to twelve carbon atoms, inclusive.
15. 1,6-bisdehydro-6-methylhydrocortisone 21-acetate.
16. 1,6-bisdehydro-6-methyl-9α-fluorohydrocortisone.
17. 1,6-bisdehydro-6-methyl - 9α - fluorohydrocortisone 21-acetate.
18. 1,6-bisdehydro-6-methyl-21-desoxycortisone.
19. 1,6-bisdehydro-6-methyl-21-desoxyhydrocortisone.
20. 1,6-bisdehydro-6-methyl-9α-fluoro-21-desoxycortisone.
21. 1,6-bisdehydro-6-methyl-9α-fluoro-21-desoxyhydrocortisone.

References Cited in the file of this patent

UNITED STATES PATENTS

| | | |
|---|---|---|
| 2,816,902 | Gould et al. | Dec. 17, 1957 |
| 2,879,279 | Van Der Burg | Mar. 24, 1959 |
| 2,882,282 | Agnello et al. | Apr. 14, 1959 |
| 2,883,379 | Moreland et al. | Apr. 21, 1959 |
| 2,907,694 | Agnello et al. | Oct. 6, 1959 |

UNITED STATES PATENT OFFICE
CERTIFICATE OF CORRECTION

Patent No. 3,031,476            April 24, 1962

John A. Hogg et al.

It is hereby certified that error appears in the above numbered patent requiring correction and that the said Letters Patent should read as corrected below.

Column 3, line 52, the arrow pointing to the right between formulae VI and V should be pointed to the left; column 6, line 39, for "17β" read -- 17α --; column 14, line 36, for "17α21" read -- 17α,21 --; column 18, line 12, for "9,(11)" read -- 9(11) --; line 27, for "ar" read -- or --; line 75, for "fo" read -- of --; column 22, line 13, for "21desoxycortisone" read -- 21-desoxycortisone --; lines 19 to 31, the formula should appear as shown below instead of as in the patent:

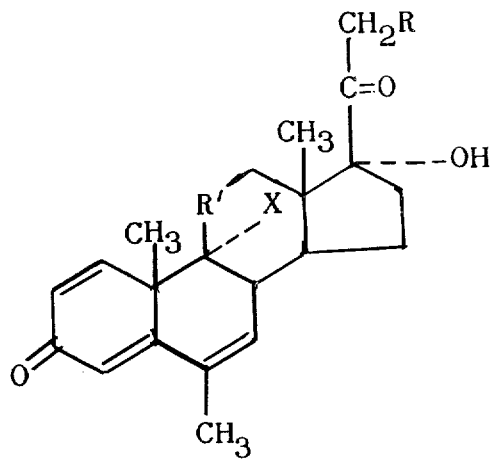

line 40, for "acyl" read -- acyloxy --.

Signed and sealed this 20th day of November 1962

(SEAL)
Attest:

ERNEST W. SWIDER
Attesting Officer

DAVID L. LADD
Commissioner
of Patents